US011567673B1

(12) United States Patent
Stoica et al.

(10) Patent No.: US 11,567,673 B1
(45) Date of Patent: Jan. 31, 2023

(54) ADAPTIVE, PROACTIVE RAID REBUILD (71) Applicant: INTERNATIONAL BUSINESS MACHINES CORPORATION, Armonk, NY (US)

(72) Inventors: Radu Ioan Stoica, Zurich (CH); Nikolas Ioannou, Zurich (CH); Roman Alexander Pletka, Uster (CH); Nikolaos Papandreou, Thalwil (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/405,672

(22) Filed: Aug. 18, 2021

(51) Int. Cl.
*G06F 3/06* (2006.01)
*G06F 11/07* (2006.01)
*G06F 11/10* (2006.01)

(52) U.S. Cl.
CPC .......... *G06F 3/0619* (2013.01); *G06F 3/0611* (2013.01); *G06F 3/0659* (2013.01); *G06F 3/0689* (2013.01); *G06F 11/0757* (2013.01); *G06F 11/1092* (2013.01)

(58) Field of Classification Search
CPC .. G06F 3/0619; G06F 3/0611; G06F 11/0757; G06F 3/0689; G06F 11/1092; G06F 3/0659
See application file for complete search history.

(56) References Cited

U.S. PATENT DOCUMENTS

| | | | |
|---|---|---|---|
| 9,128,910 B1 * | 9/2015 | Dayal | G06F 11/1088 |
| 9,436,396 B2 | 9/2016 | Colgrove et al. | |
| 9,442,802 B2 * | 9/2016 | Hung | G06F 11/1088 |
| 10,241,722 B1 | 3/2019 | Malwankar et al. | |
| 10,374,634 B2 * | 8/2019 | Malina | G06F 11/1076 |
| 11,112,978 B2 * | 9/2021 | Danilov | G06F 3/0611 |
| 2007/0101187 A1 | 5/2007 | Daikokuya et al. | |
| 2012/0066449 A1 * | 3/2012 | Colgrove | G06F 11/0751 |
| | | | 711/E12.001 |
| 2016/0188223 A1 * | 6/2016 | Camp | G06F 12/0868 |
| | | | 711/103 |

(Continued)

OTHER PUBLICATIONS

Nima Elyasi; Extracting Better Performance From The Parallelism Offered By SSDs; The Pennsylvania State University, The Graduate School College of Engineering; Published Date: May 2019.

(Continued)

*Primary Examiner* — Mark A Giardiino, Jr.
(74) *Attorney, Agent, or Firm* — Brian F. Russell; Eyal Gilboa (57) ABSTRACT

A data storage system includes a plurality of storage devices organized as a redundant array of inexpensive disks (RAID) storage array and a RAID controller. The RAID controller monitors the plurality of storage devices in the RAID storage array. The RAID controller also detects that a host read request of a host has a latency exceeding a latency threshold. Based on the monitoring, the RAID controller determines whether a proactive rebuild of a data requested by the host read request in absence of a data error would likely be beneficial to performance. Based on determining that a proactive rebuild of the data requested by the host read request would likely be beneficial to performance, the RAID controller initiates the proactive rebuild of the data and sends the requested data to the host.

20 Claims, 5 Drawing Sheets (56) References Cited

U.S. PATENT DOCUMENTS

2019/0278656 A1    9/2019  Hayes et al.
2020/0026439 A1*   1/2020  Gao ..................... G06F 3/0653

OTHER PUBLICATIONS

K. V. Rashmi et al.; A "Hitchhiker's" Guide to Fast and Efficient Data Reconstruction in Erasure-coded Data Centers pp. 331-342; Published Date: Aug. 2014.

* cited by examiner

ADAPTIVE, PROACTIVE RAID REBUILD

BACKGROUND OF THE INVENTION

The present disclosure is generally directed to data storage and, more particularly, to non-volatile storage systems. Still more particularly, the present disclosure is directed to a non-volatile storage system implementing a RAID architecture that can also be selectively leveraged to reduce the response times of read input/output operations.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in physical blocks (also referred to as "erase blocks") of memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis. NAND flash memory is commonly used to implement solid state disks (SSDs), which provide non-volatile storage having a low average access latency.

Although SSDs are characterized by low average access latencies, particularly as compared to older storage technologies such as rotating magnetic disk storage and tape drives, SSDs often have high read tail latencies. That is, in SSDs, infrequently some read requests exhibit an access latency that is significantly longer than average, for example, 10 to 100 times the average read access latency. These high read tail latencies occur for a variety of reasons, including transient latency degradation due to the occurrence of one or more asynchronous background management activities such as garbage collection, voltage calibration, wear leveling, and data scrubbing or the coincidence of the read request with a high latency I/O operation such as page programming or block erasure. In other cases, high read tail latencies may be due to characteristics of the SSD architecture, for example, queuing delays resulting from read requests targeting a same channel, chip, or plane as recent prior I/O requests or the fill level of caches.

In the prior art, many existing strategies have been employed to reduce read tail latencies, including implementing program and erase suspend for NAND flash chips, improving I/O command scheduling (e.g., advancing reads before writes, enabling request priority levels, etc.), imposing higher level control over the background maintenance activities, or redirecting interfering write requests to non-conflicting flash devices and/or serving read requests from different storage devices by leveraging the redundancy inherent in an implemented RAID scheme. The present application recognizes that these existing approaches either do not fully solve the issue of the high read tail latencies for data storage systems or require significant changes to the storage system and the underlying storage devices.

BRIEF SUMMARY

In at least one embodiment, read tail latencies in a data storage system are capped by a controller selectively performing a proactive RAID rebuild.

In at least one embodiment, a data storage system includes a plurality of storage devices organized as a redundant array of inexpensive disks (RAID) storage array and a RAID controller. The RAID controller monitors the plurality of storage devices in the RAID storage array. The RAID controller also detects that a host read request of a host has a latency exceeding a latency threshold. Based on the monitoring, the RAID controller determines whether a proactive rebuild of a data requested by the host read request in absence of a data error would likely be beneficial to performance, for example, by reducing the data access latency of the host read request. Based on determining that a proactive rebuild of the data requested by the host read request would be likely to reduce the data access latency of the host read request, the RAID controller initiates the proactive rebuild of the data and sends the requested data to the host.

In some embodiments, the storage devices employed in the RAID storage array may be implemented with NAND flash memory; however, the described technique is not limited to such embodiments and is instead generally applicable to data storage systems employing diverse storage technologies.

DETAILED DESCRIPTION

Figure 1:
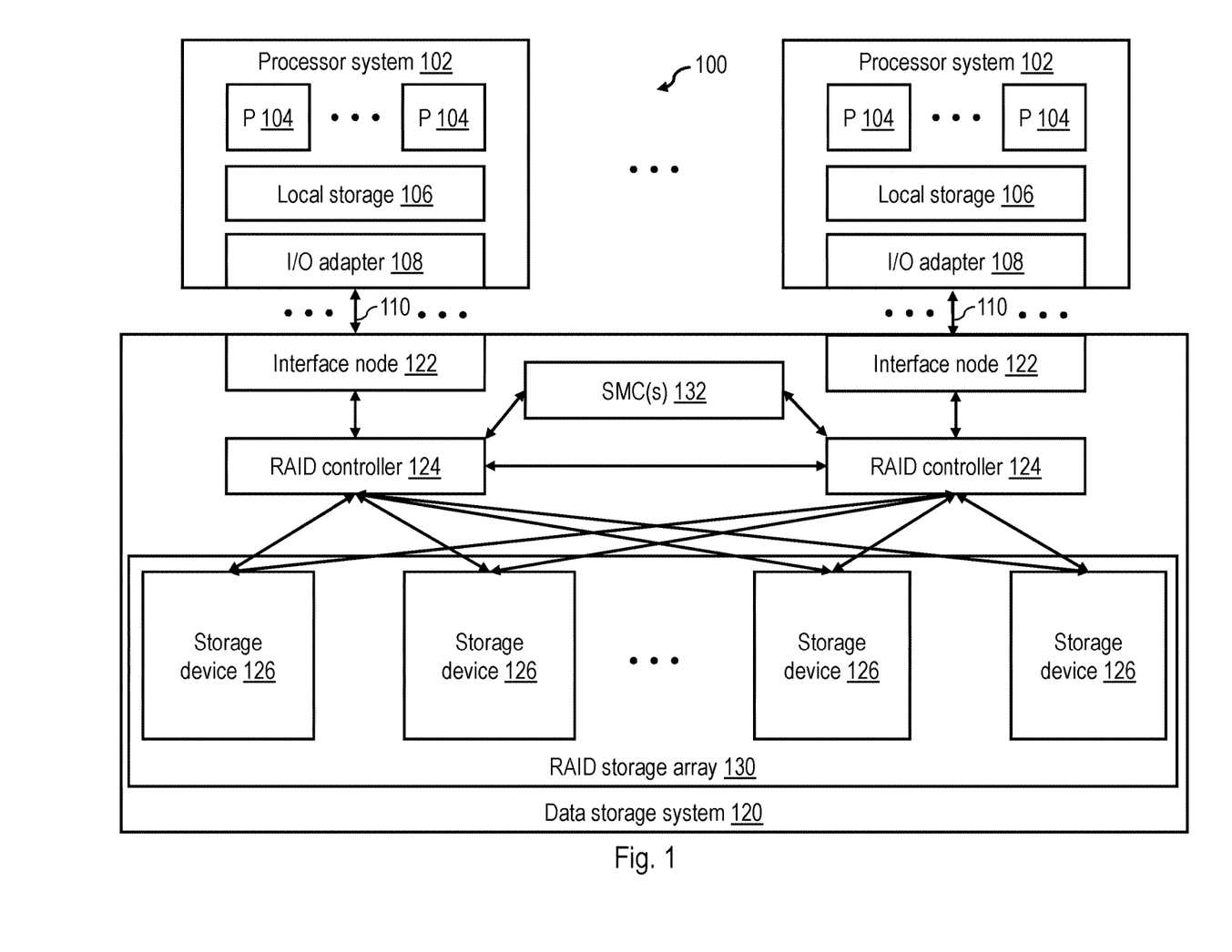
FIG. 1 is a high-level block diagram of a data processing environment in accordance with one embodiment.

With reference to the figures and with particular reference to FIG. 1, there is illustrated a high-level block diagram of an exemplary data processing environment 100 including a data storage system 120 having a RAID (Redundant Array of Independent Disks) storage array as described further herein. As shown, data processing environment 100 includes one or more hosts, such as a processor system 102 having one or more processors 104 that process instructions and data. Processor system 102 may additionally include local storage 106 (e.g., DRAM or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER® series available from International Business Machines Corporation), or a mainframe computer system. Processor system 102 can also be an embedded processor system using various processors such as ARM®, POWER, Intel x86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), Infini-Band, Transport Control Protocol/Internet Protocol (TCP/IP), Peripheral Component Interconnect Express (PCIe), Non-volatile Memory Express (NVMe), NVMe over Fabrics (NVMe-oF), etc. I/O commands communicated via I/O channel 110 include host read commands by which a processor system 102 requests data from data storage system 120 and host write commands by which a processor system 102 requests storage of data in data storage system 120.

In the illustrated embodiment, data storage system 120 includes multiple interface nodes 122 through which data storage system 120 receives and responds to I/O commands via I/O channels 110. Each interface node 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each storage device in a RAID storage array 130. In the depicted example, RAID storage array 130 comprises multiple storage devices 126 including NAND flash storage media. In other embodiments, RAID storage array 130 may alternatively or additionally include storage devices implemented with other storage technologies, such as other types of non-volatile memory (e.g., NVRAM, MRAM, etc.), magnetic disks (e.g., hard disk drives (HDDs)), tape drives, etc. Data storage system 120 may additionally include one or more system management controller(s) 132 that implement higher-level management of RAID controllers 124.

Figure 2:
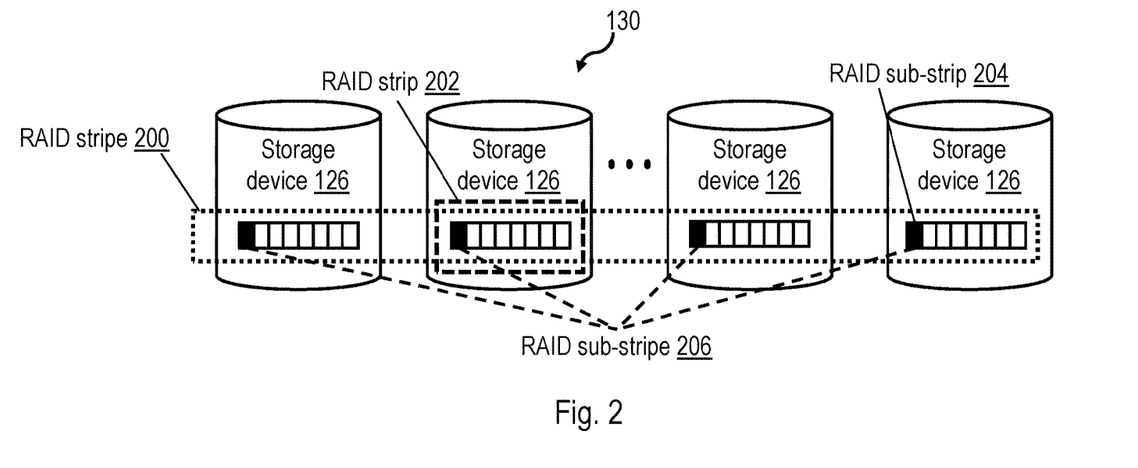
FIG. 2 depicts an exemplary RAID storage array in accordance with one embodiment.

As is known in the art, for at least some RAID levels, RAID storage array 130 protects data stored in RAID storage array 130 by striping data and associated parity information protecting the data across multiple storage devices. FIG. 2 illustrates the structure of an individual exemplary RAID stripe 200 in RAID storage array 130 in accordance with one embodiment. As noted above, RAID storage array 130 includes a plurality of physical storage devices 126, which may include, for example, flash cards or other non-volatile memory storage devices, magnetic disks, tape drives, etc. The portion of a given RAID stripe 200 stored on an individual storage device 126 is referred to as a RAID strip 202. Each RAID strip 202 in turn includes one or more RAID sub-strips 204, which, depending on the underlying storage technology, may correspond, for example, to individual data pages or data blocks. The corresponding RAID sub-strips 204 in each RAID stripe 200 together form a RAID sub-stripe 206.

Figure 3:
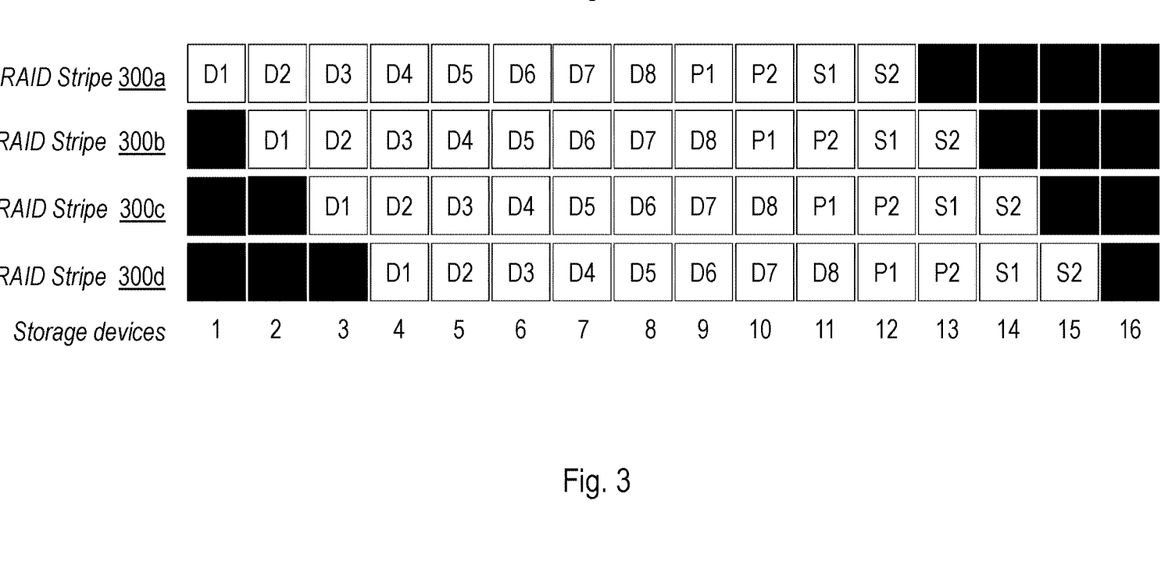
FIG. 3 illustrates an exemplary striping arrangement in a RAID storage array in accordance with one embodiment.

In various embodiments, RAID controllers 124 may implement any of a variety of different RAID schemes in RAID storage array 130, such as, for example, a RAID 5 or RAID 6 scheme. Although any conventional or hereafter invented RAID scheme that employs data striping can generally be used, FIG. 3 illustrates one example of a RAID scheme that can be utilized by RAID controller 124 to store data in RAID storage array 130 in accordance with one embodiment.

In the depicted example, RAID controllers 124 implement a RAID erasure coding scheme with a stripe format that can generally be described with the following equation:

$$nD+kP+jS$$

where D signifies RAID strips storing data, P signifies RAID strips storing parity information, S signifies spare RAID strips, n and k are integers greater than or equal to 1, j is an integer greater than or equal to 0, and the sum n+k+j is less than or equal to the total number of storage devices in the RAID storage array 130. More specifically, in this example, the total number of storage devices 126 is 16, n=8, k=2, and j=2, which results in a RAID 6 parity scheme with 2 distributed spares. As further shown in this example, the storage device 126 to which the initial RAID strip 202 of data in each RAID stripe 200 is written is selected on a round-robin basis. Thus, for example, the initial RAID strip of data D1 in RAID stripe 300a is written to storage device 1, the initial RAID strip of data D1 in RAID stripe 300b is written to storage device 2, etc. RAID controller 124 may determine the physical storage location of each RAID strip 202 within each storage device 126, for example, based on an arithmetic operation (e.g., hash) operating on the logical block address (LBA) specified in a host write request.

Figure 4:
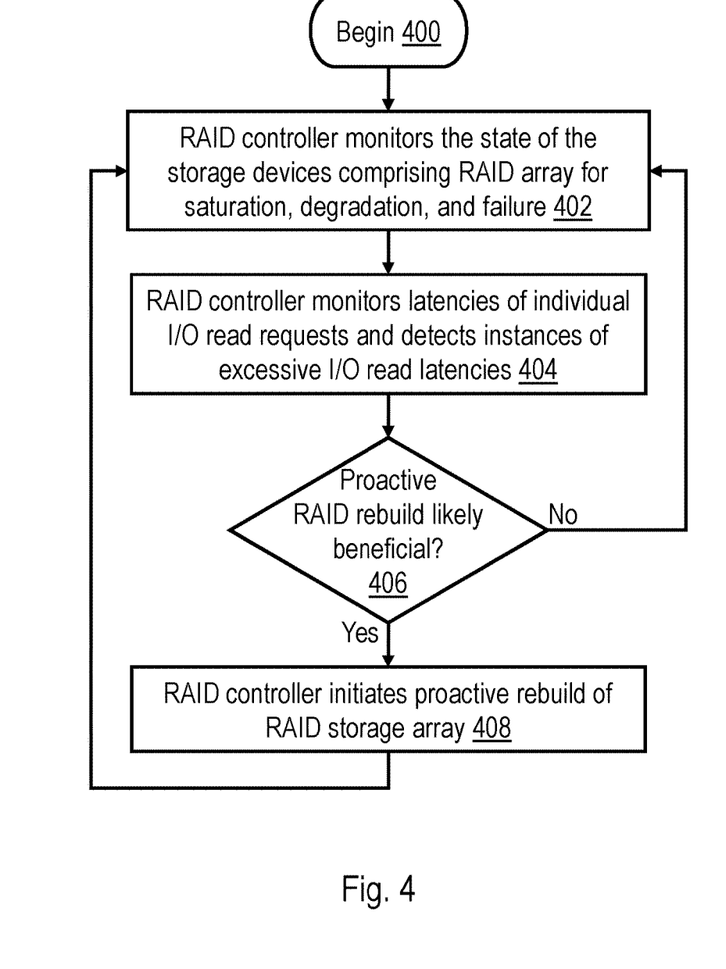
FIG. 4 is a high-level logical flowchart of an exemplary method of proactively rebuilding data in a RAID storage array in accordance with one embodiment.

Referring now to FIG. 4, there is depicted a high-level logical flowchart of an exemplary method of proactively rebuilding a RAID storage array in a data storage array in accordance with one embodiment. The illustrated process may be performed by one or more RAID controllers 124 of data storage system 120 to cap the tail latency of host read requests requesting data stored in RAID storage array 130.

The process of FIG. 4 begins at block 400 and then proceeds to block 402, which illustrates RAID controller 124 monitoring the individual state of each of the storage devices 126 comprising RAID storage array 130. In particular, RAID controller 124 continuously monitors each storage device 126 for saturation, degradation, and failure. Saturation refers to the I/O load on each storage device 126 as reflected, for example, by the number of pending I/O requests in the I/O read queue and I/O write queue of each storage device 126. Degradation refers to a latency metric for each storage device 126. For example, RAID controller 124 detects that a storage device 126 is operating in a degraded state if, on average, I/O requests require longer than expected to complete despite the storage device 126 not being saturated. Failure refers to the inability of a storage device 126 to contribute to the servicing of one or more I/O requests, for example, due to corruption of a RAID strip 202 stored by the storage device 126. At block 404, RAID controller 124 additionally monitors latencies of individual host read requests and detects instances of excessive read latencies, if any.

Block 406 depicts RAID controller 124 determining whether or not a proactive rebuild of data in RAID storage array 130 would be beneficial to performance, for example, by reducing the data access latency of host read requests. In at least some embodiments, the determination illustrated at block 406 is based on static parameters, such as the storage technology utilized to implement storage devices 126 (e.g., flash memory, HDDs, tape drives, etc.), the storage architecture of RAID storage array 130, and the RAID scheme applied in RAID storage array 130. In addition, RAID controller 124 preferably makes the determination shown at block 406 based on dynamic parameters, such as the dynamic state of the individual storage devices 126 and the dynamic state of RAID storage array 130. In response to RAID controller 124 determining at block 406 that a proactive rebuild of RAID storage array 130 is not likely to be beneficial to performance, RAID controller 124 continues the monitoring depicted at block 402-404, as indicated by the process of FIG. 4 returning to block 402. If, however, RAID controller 124 determines at block 406 that a proactive rebuild of RAID storage array 124 is likely to be beneficial to performance, RAID controller 124 initiates a proactive rebuild of data in RAID storage array 130 requested by a host read request experiencing high latency.

The rebuild operation is said to the "proactive" in that the rebuild is not necessitated by, and is performed in the absence of, detection of a failure in one of storage devices 126 comprising RAID storage array 130.

The present disclosure recognizes that the performance impact of the rebuild of RAID storage array 130 on host I/O requests can vary, depending on the manner in which the determination depicted at block 406 is made. For example, the rebuild of data in the RAID storage array can create great inefficiency due to the amplification of the number of reads performed. Further, the rebuild read operations can delay other host I/O requests and therefore exacerbate the latency tail. In the worst case, the exacerbation of the latency tail of other host read requests can lead to a positive feedback loop in which higher read latencies lead to more proactive data rebuilds being performed. It is therefore desirable to initiate a proactive RAID rebuild only if a sufficient number of storage devices is available to quickly service the additional rebuild read requests, given the RAID architecture and the available redundancy in the affected RAID stripe.

Figure 5:
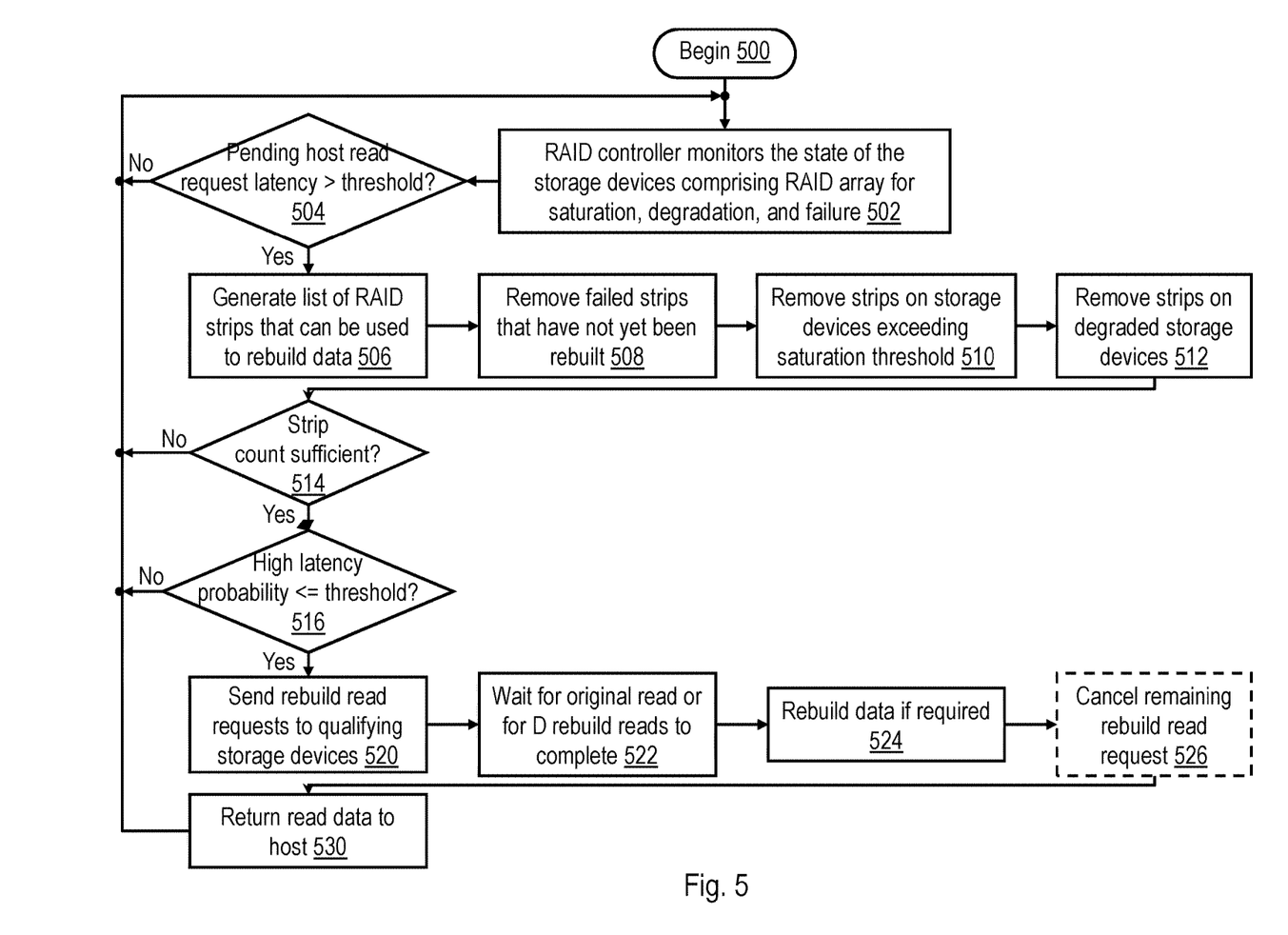
FIG. 5 is a more detailed logical flowchart of an exemplary method of proactively rebuilding data in a RAID storage array in accordance with one embodiment.

With reference now to FIG. 5, there is illustrated a more detailed logical flowchart of an exemplary method of proactively rebuilding a RAID storage array 130 in a data storage system 120 in accordance with one embodiment. Again, the illustrated process may be performed by one or more RAID controllers 124 of data storage system 120 to cap the tail latency of hosts read requests for data stored in RAID storage array 130.

The process of FIG. 5 begins at block 500 and then proceeds to block 502, which illustrates RAID controller 124 monitoring the state of each of the storage devices 126 comprising RAID storage array 130 regarding saturation, degradation, and failure. In one embodiment, RAID controller 124 implements separate read and write counters for in-flight host read requests and host write requests for each storage device 126. RAID controller 124 can increment a particular counter when an I/O request of the relevant type is issued to the associated storage device 126 and decrement the particular counter when that I/O request completes. RAID controller 124 can compute a respective saturation (or I/O load) metric for each storage device 126 by multiplying the current read count value with a first weight to obtain a first product, multiplying the current write count value with a different second weight to obtain a second product, and summing the first and second products to compute the saturation (or I/O load) metric. In some embodiments, RAID controller 124 determines that a storage device 126 is saturated if the saturation metric satisfies (e.g., is greater than or equal to) a saturation threshold. In at least some embodiments, RAID controller 124 may alternatively or additionally detect saturation of a storage device 126 based on static parameters, such as the request parallelism supported by the storage technology utilized to implement the storage devices 126.

At block 502, RAID controller 124 may additionally detect degradation of a storage device 126, meaning temporary and/or periodic latency spikes for accesses to the storage device 126. For example, in the case in which storage devices 126 are implemented with NAND flash cards, these temporary or periodic latency spikes may be due to background maintenance activities such as garbage collection or the destaging of data between different storage tiers. RAID controller 124 may detect such latency spikes, for example, by counting the aggregate number of high latency I/O requests for a given storage device 126 in an immediately previous observation time interval (e.g., of 100 ms to 10 s in duration) and/or by maintaining a count per storage device 126 of the number of in-flight I/O requests having a pendency over a predetermined age threshold.

At block 504, RAID controller 124 determines whether or not the latency of a pending host read request to a particular storage device 126 is greater than a read latency threshold. In some embodiments, the read latency threshold is static and is predetermined to be a multiple of (e.g., 2 to 5 times) the stated read latency of the storage device 126. For example, if the request latency of a storage device 126 is specified to be 150 µs, the read latency threshold may be predetermined to be a value between 300 µs and 750 µs. In some embodiments, RAID controller 124 may instead adapt the read latency threshold based on the product of a predetermined factor (e.g., between 1 and 10) and the average observed latency of a storage device 126 for an immediately previous observation window or for a predetermined number of I/O read requests. In yet other embodiments, RAID controller 124 may determine the read latency threshold of a storage device 126 based on the current I/O load determined for the storage device 126 at block 502. Thus, for heavier workloads, RAID controller 126 can increase the read latency threshold, and for lighter workloads RAID controller 126 can decrease the read latency threshold. In response to a negative determination at block 504, the process of FIG. 5 returns to block 502, which has been described. If, however, RAID controller 124 makes an affirmative determination at block 504, the process of FIG. 5 proceeds to block 506.

Block 506 depicts RAID controller 124 generating a rebuild list of RAID strips 202 based on the RAID configuration that can be utilized to rebuild the RAID stripe 200 targeted by the host read request identified at block 504 as having a latency greater than the read latency threshold. Membership in this list of RAID strips 202 is determined based on the selected stripe configuration. RAID controller 124 then pares down the rebuild list of RAID strips 202 at blocks 508-512 by removing from the rebuild list any failed RAID strips 202 that have not yet been rebuilt (block 508), any RAID strips 202 on storage devices 126 determined at block 502 to exceed the saturation threshold (block 510), and any RAID strips 202 on storage devices 126 determined at block 502 to be degraded (block 512). RAID controller 124 removes these RAID strips 202 from the rebuild list because the associated storage devices 126 are unable and/or unlikely to return data in a timely fashion.

RAID controller 126 determines at block 514 whether or not sufficient RAID strips 202 remain in the rebuild list to enable the RAID strip 202 targeted by the long latency host read request to be rebuilt. For example, assuming a RAID encoding scheme having 16 storage devices 126 for storing RAID strips 202 containing user data and 3 storage devices 126 for storing RAID strips 202 containing parity information, data in a RAID strip 202 stored on a storage device 126 having a latency exceeding the read latency threshold can be rebuilt from any 16-strip subset out of the remaining 18 strips 126. In order to accelerate the rebuild process and reduce the probability of encountering an additional high latency read during the proactive rebuild, more than 16 strips (for example 17 or 18 strips) can be read in parallel during the rebuild. Once the first 16 strips are retrieved, the high latency stripe can be reconstructed. In response to a determination that sufficient RAID strips 202 to perform a proactive rebuild do not remain in the rebuild list, the process of FIG. 5 returns to block 502. However, in response to a determination that sufficient RAID strips 202 remain in the rebuild list to proactively rebuild the high-latency RAID strip 202, the process proceeds to block 516.

At block 516, RAID controller 124 determines whether or not a proactive rebuild of the affected RAID strip 202 is likely to be beneficial to performance. In the depicted embodiment, this determination is made based on whether the probability of a random occurrence of a high tail latency for a rebuild read request is less than a selected probability threshold for the implemented RAID scheme and redundancy level. In at least some storage technologies, such as NAND flash memory, all read requests have a random probability of incurring a high latency, even if the relevant storage devices 126 are operating at a low I/O load. In NAND flash memory, unpredictable latency spikes for read requests may be caused by the mapping of multiple data blocks to the same flash device, retries caused by media errors, host I/O writes or block erasures that are in progress, and/or background management activities such as calibration, wear leveling, garbage collection, and/or checkpointing. In some embodiments, RAID controller 124 determines the probability of a rebuild read request having a high tail latency greater than the selected probability threshold statically based on offline experiments that determine a probability value, which can be preloaded into firmware for RAID controller 124. In other embodiments, RAID controller 124 determines the probability of the random occurrence of a high tail latency for a rebuild read request based on the number of high latency I/O requests detected during the observation window of the degradation monitoring performed at block 502.

Figure 6:
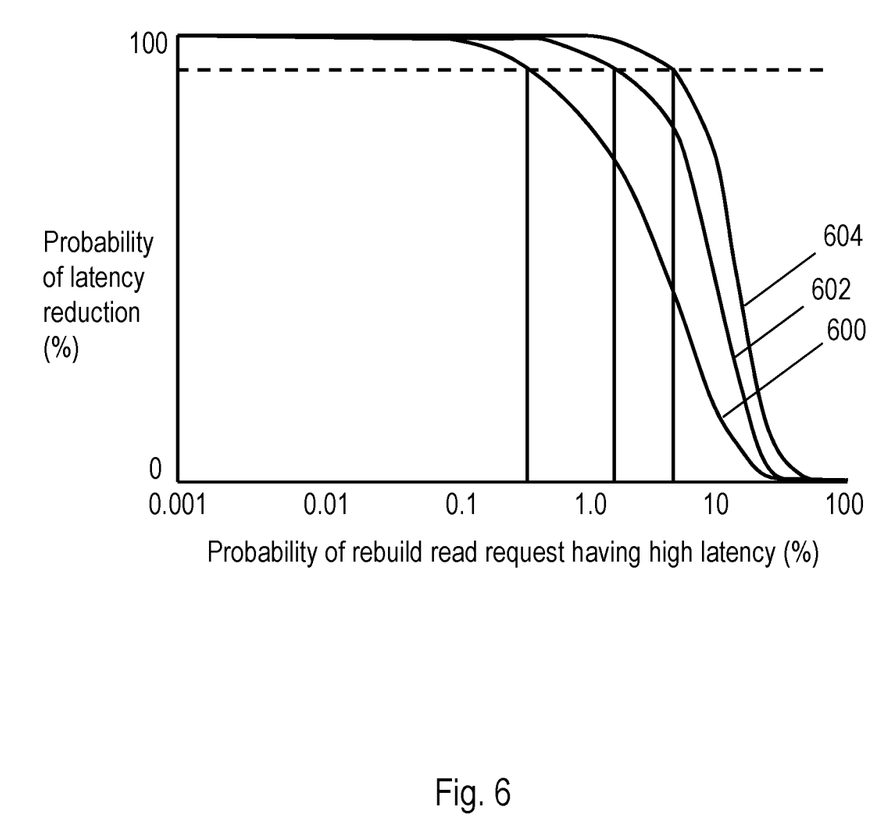
FIG. 6 is a graph depicting the probability of a proactive rebuild achieving latency reduction versus the probability of a read having high latency for various RAID configurations in accordance with one embodiment.

In general, it is desirable for RAID controller 124 to issue a rebuild command for the affected RAID only if it is very likely that the proactive RAID rebuild will reduce latency. The likelihood of success in a proactive RAID rebuild improving performance depends on the probability of the rebuild read requests to have a high tail latency and how many additional strips above the reconstruction threshold are available. Turning now to FIG. 6, the probability of achieving a latency reduction is graphed versus the probability of a rebuild read request having a long tail latency when different numbers are devices are available for the proactive rebuild. It should be noted that the probability of a rebuild read request having a long tail latency is graphed on a logarithmic scale. In FIG. 6, curve 604 represents the relationship of these probabilities for a RAID erasure code scheme where, after removing all saturated and degraded strips, 16 RAID strips 202 of data or parity must be all read for the proactive rebuild; curve 602 illustrates the relationship of these probabilities for a RAID erasure code scheme where, after removing all saturated and degraded strips, any 16 RAID strips 202 of data or parity can be read out of 17 available strips for the proactive rebuild; and curve 604 gives the relationship of these probabilities for a RAID erasure code scheme where, after removing all saturated and degraded strips, any 16 RAID strips 202 of data or parity can be read out of 18 available strips available for the proactive rebuild. In this example, it is assumed that storage devices 126 have an uncorrelated random chance of incurring a high latency when servicing a rebuild read request and that a probability threshold for achieving a latency reduction is set to be at least 90%. Given this probability threshold, RAID controller 124 will determine that it is beneficial to initiate a proactive rebuild of RAID stripe 200 when 16 devices are available for the rebuild corresponding to curve 600 if high read latencies occur less than about 0.35% of time, that it is beneficial to initiate a proactive rebuild of RAID stripe 200 when 17 devices are available for the rebuild corresponding to curve 602 if high read latencies occur less than about 2.0% of time, and that it is beneficial to initiate a proactive rebuild of RAID stripe 200 when 18 devices are available for the rebuild corresponding to curve 604 if high read latencies occur less than about 5.0% of time.

In response to RAID controller 124 determining at block 516 that a proactive rebuild of the affected RAID strip 202 is not likely to be beneficial to performance, the process of FIG. 5 returns to block 502, which has been described. If, however, RAID controller 124 determines at block 516 that a proactive rebuild of the affected RAID strip 202 is likely beneficial to performance, the process proceeds to block 520. Block 520 illustrates RAID controller 124 issuing a rebuild read request to each of storage devices 126 storing a RAID strip 202 in the list of RAID strips 202 as generated at block 506 and pared down in blocks 508-512. At block 522, RAID controller 124 awaits the first to occur of: (1) all of the rebuild read requests returning read data or (2) the initial high latency host read request returning read data. As indicated at blocks 524, if sufficient read requests complete to allow rebuilding the high latency strip prior to the initial high latency read request returning read data, RAID controller 124 rebuilds the read data requested by the host read request from the data and parity information obtained by the rebuild read requests. RAID controller 124 returns the requested read data to the requesting host platform (block 530) and optionally cancels the pending high latency host read request (block 526). If, however, the high latency host read request completes before sufficient read requests complete to allow rebuilding the high latency strip, RAID controller 124 returns the requested read data to the host platform (block 526), cancels the proactive rebuild of the RAID strip 202 accessed by the host read request, and optionally cancels all still-pending rebuild read requests. Following block 530, the process of FIG. 5 returns to block 502.

As has been described, in at least one embodiment, a data storage system includes a plurality of storage devices organized as a redundant array of inexpensive disks (RAID) storage array and a RAID controller. The RAID controller monitors the plurality of storage devices in the RAID storage array. The RAID controller also detects that a host read request of a host has a latency exceeding a latency threshold. Based on the monitoring, the RAID controller determines whether a proactive rebuild of a data requested by the host read request in absence of a data error would likely be beneficial to performance, for example, by reducing the data access latency of the host read request. Based on determining that a proactive rebuild of the data requested by the host read request would likely reduce the data access latency of the host read request, the RAID controller initiates the proactive rebuild of the data and sends the requested data to the host.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the appended claims. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of a NAND flash memory, it should be appreciated that embodiments of the present invention can also be used with other types of storage devices, including non-volatile random access memory (NVRAM), magnetic disk, tape drives, etc.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of controlling a data storage system including a plurality of storage devices organized as a redundant array of inexpensive disks (RAID) storage array and a RAID controller, the method comprising:
the RAID controller of the RAID storage array monitoring the plurality of storage devices in the RAID storage array;
the RAID controller detecting that a host read request of a host has a latency exceeding a latency threshold;
based on the monitoring, the RAID controller determining whether a proactive rebuild of data requested by the host read request in absence of a data error would be likely to reduce the data access latency of the host read request, wherein the determining includes determining whether a probability that a rebuild read request will be subject to a random occurrence of high access latency exceeds a probability threshold; and
based on determining that a proactive rebuild of the data requested by the host read request would be likely to reduce the data access latency of the host read request, the RAID controller initiating the proactive rebuild of the data.

2. The method of claim 1, wherein:
the monitoring includes monitoring each of the plurality of storage devices for at least an I/O load.

3. The method of claim 1, further comprising:
the RAID controller dynamically determining the latency threshold based on at least an average I/O request response time of a storage device among the plurality of storage devices targeted by the host read request.

4. The method of claim 1, further comprising:
the RAID controller dynamically determining the latency threshold based on at least an I/O load of a storage device among the plurality of storage devices targeted by the host read request.

5. The method of claim 1, further comprising determining the probability based on a number of high latency I/O requests detected during an observation window preceding the host read request.

6. The method of claim 1, further comprising:
the RAID controller canceling the host read request.

7. The method of claim 1, wherein:
the host read request requests a data stripe including multiple data strips;
each of the multiple data strips is stored on a different respective one of the plurality of storage devices; and
determining whether a proactive rebuild of data requested by the host read request in absence of a data error would be likely to reduce the data access latency of the host read request includes determining a number of data strips above a reconstruction threshold required to rebuild the data stripe that are presently available for access.

8. A data storage system, comprising:
a redundant array of inexpensive disks (RAID) controller for a plurality of storage devices configured as a RAID storage array, wherein the RAID controller is configured to perform:
monitoring the plurality of storage devices in the RAID storage array;
detecting that a host read request of a host has a latency exceeding a latency threshold;
based on the monitoring, determining whether a proactive rebuild of data requested by the host read request in absence of a data error would be likely to reduce the data access latency of the host read request, wherein the determining includes determining whether a probability that a rebuild read request will be subject to a random occurrence of high access latency exceeds a probability threshold; and
based on determining that a proactive rebuild of the data requested by the host read request would be likely to reduce the data access latency of the host read request, initiating the proactive rebuild of the data.

9. The data storage system of claim 8, wherein:
the monitoring includes monitoring each of the plurality of storage devices for at least an I/O load.

10. The data storage system of claim 8, wherein the RAID controller is further configured to perform:
dynamically determining the latency threshold based on at least an average I/O request response time of a storage device among the plurality of storage devices targeted by the host read request.

11. The data storage system of claim 8, wherein the RAID controller is further configured to perform:
dynamically determining the latency threshold based on at least an I/O load of a storage device among the plurality of storage devices targeted by the host read request.

12. The data storage system of claim 8, wherein the RAID controller is further configured to perform determining the probability based on a number of high latency I/O requests detected during an observation window preceding the host read request.

13. The data storage system of claim 8, further comprising:
the RAID controller canceling the host read request.

14. The data storage system of claim 8, further comprising the RAID storage array.

15. A program product, comprising:
a storage device;
program code stored on the storage device and executable by a redundant array of inexpensive disks (RAID) controller of a RAID storage array including a plurality of storage devices to cause the RAID controller to perform:

monitoring the plurality of storage devices in the RAID storage array;

detecting that a host read request of a host has a latency exceeding a latency threshold;

based on the monitoring, determining whether a proactive rebuild of data requested by the host read request in absence of a data error would be likely to reduce the data access latency of the host read request, wherein the determining includes determining whether a probability that a rebuild read request will be subject to a random occurrence of high access latency exceeds a probability threshold; and based on determining that a proactive rebuild of the data requested by the host read request would be likely to reduce the data access latency of the host read request, initiating the proactive rebuild of the data.

16. The program product of claim 15, wherein:

the monitoring includes monitoring each of the plurality of storage devices for at least an I/O load.

17. The program product of claim 15, wherein the program code causes the RAID controller to perform:

dynamically determining the latency threshold based on at least an average I/O request response time of a storage device among the plurality of storage devices targeted by the host read request.

18. The program product of claim 15, wherein the program code causes the RAID controller to perform:

dynamically determining the latency threshold based on at least an I/O load of a storage device among the plurality of storage devices targeted by the host read request.

19. The program product of claim 15, wherein the program code causes the RAID controller to perform determining the probability based on a number of high latency I/O requests detected during an observation window preceding the host read request.

20. The program product of claim 15, further comprising:

the RAID controller canceling the host read request.

* * * * *